Feb. 2, 1965    R. GOSPODAR    3,168,244
HEATING SYSTEMS FOR MOTOR VEHICLES
Filed May 24, 1963    3 Sheets-Sheet 1

INVENTOR
Reinhard Gospodar
BY Watson Cole Grindle & Watson
ATTORNEYS

INVENTOR
Reinhard Gospodar

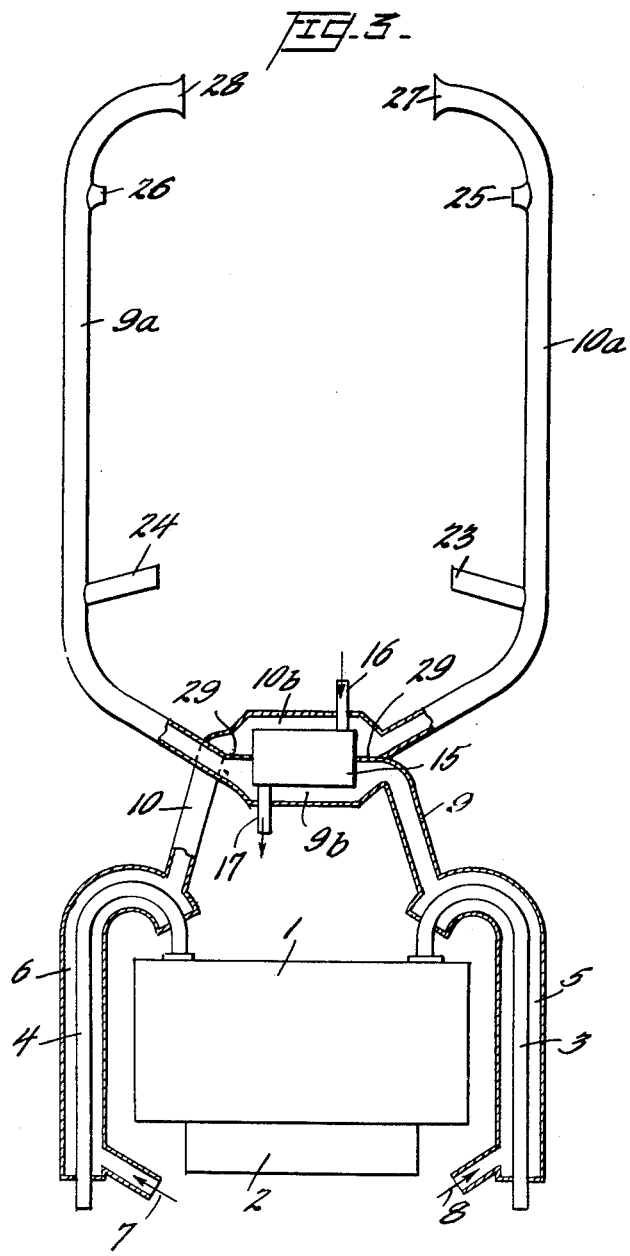

United States Patent Office 3,168,244
Patented Feb. 2, 1965

3,168,244
HEATING SYSTEMS FOR MOTOR VEHICLES
Reinhard Gospodar, Eichelkamp 36, Wolfsburg, Germany
Filed May 24, 1963, Ser. No. 283,050
Claims priority, application Germany, May 25, 1962,
V 22,552
1 Claim. (Cl. 237—12.3)

This invention relates to a heating system for automobiles or motor vehicles of all types having a heat exchanger or exchangers, heated by the exhaust gases from the motor and a forced air or blower is provided which directs warm or heated air into the internal space of the body of the vehicle.

It is an object of the invention to strengthen the capacity or output of the heating system to provide overall heating within the body of the vehicle.

A further object of the invention is to provide a heating system with an auxiliary heating means in the form of a combustion chamber to burn a fuel-air mixture which functions with complete safety.

Another object of the invention is to provide a heat conduit or pipe with at least one combustion chamber for burning a fuel-air mixture as a heat exchanger in which air originally heated by the exhaust engine gases will be additionally heated.

In accordance with the invention, the exhaust gases of the vehicle motor will heat the air stream to be given a further heating by low combustion pressure so that the forced air flow will be simple and efficient and the air for the combustion chamber may be divided from the heated air directed from the combustion motor. Thus, the combustion chamber will be given a preliminary pre-heating which is essentially safe.

It is a further object of the invention to provide the outflow hot cooling air from a motor as a front stream into which the air inlets for the heat exchangers are directed, so that the heated air will be further heated by auxiliary means to provide sufficiently heated air for the defroster nozzles adjacent the windshield. A further object of the invention resides in a heating chamber in the heated air flow from the heat exchanger so that the hot or heated air will be directed into the internal space of the vehicle body.

In motors which have at least two exhaust manifolds, the heat conduits are directed over a centrally located combustion chamber as a heat exchanger so that the two heat lines will be separated from one another. The invention will present a space saving which is particularly true when the heat exchangers form combustion chambers in which the longitudinal axis thereof are placed at right angles to the direction of movement of the vehicle. Also, the heat conduits may cross each other as the auxiliary heat exchanger is provided with a central wall to direct the flows of heated air from one side of the room to the other.

Further objects will be apparent from the following description in connection with the accompanying drawings in which:

FIG. 3 is a diagrammatic plan view partly in section of a modified heating system in which the combustion chamber is arranged near the motor of the vehicle.

Figure 1:
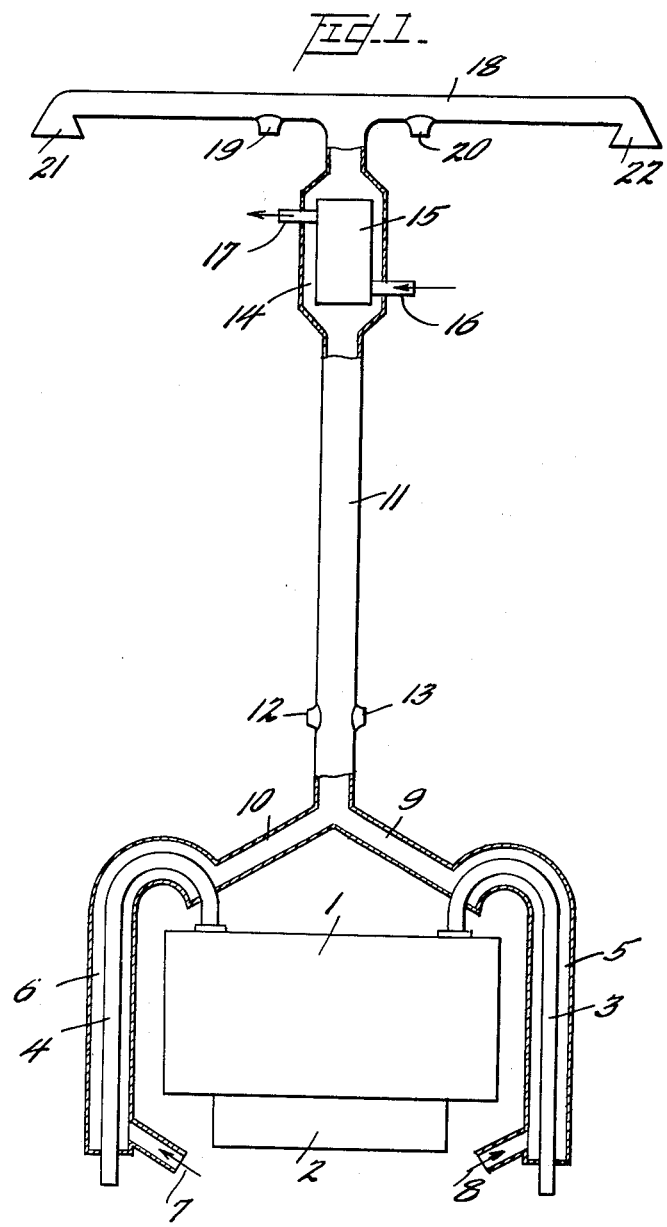
FIG. 1 is a diagrammatic plan view partly in section of a combustion chamber with the hot air system in the front near the foot space of the occupants.
Figure 2:
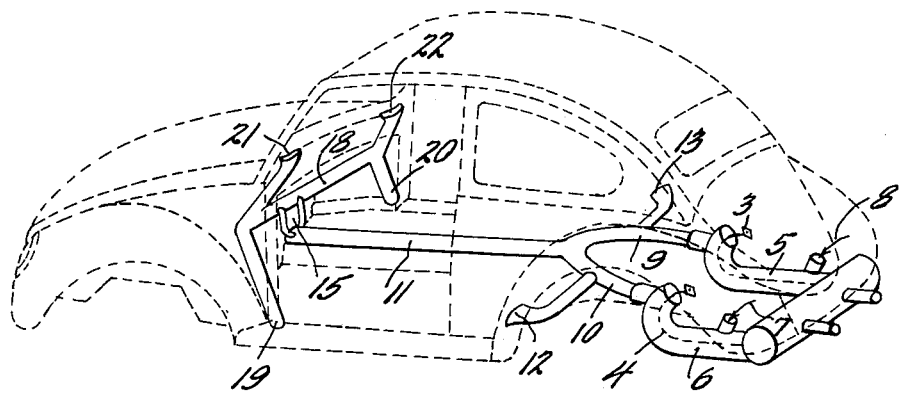
FIG. 2 is a perspective view of the heating system of FIG. 1 as mounted in a motor vehicle.

Referring to FIG. 1 of the first form of the invention, 1 indicates the motor for the vehicle and 2 is the cooling device such as a fan or other forced draft for the motor. Two outlet tubes or manifolds 3 and 4 for the gases of combustion from the motor 1 pass through surrounding cases, jackets or heat exchangers 5 and 6 respectively and air passes through the exchangers 5 and 6 as directed by the arrows 7 and 8, which is in operative communication and flow with the air from the cooling fan or blast 2. The casings 5 and 6 are connected with outlet passages 9 and 10, respectively which, according to FIGS. 1 and 2, communicate with a central heat line 11 which latter is provided near the end nearest the motor with outlet openings 12 and 13 which, as shown, may be provided direct in the line or conduit 11 or in the connecting branches 9 and 10 as extended pipe sections as shown in FIG. 2. Near the front or foot space of the vehicle body there is provided an enlarged passageway 14 of the conduit 11, in which there is provided a combustion chamber 15, which latter has an entry tube or channel 16 connected thereto for the fuel-air mixture and an outlet passage or tube 17 for the combustion gases. The passages 16 and 17 are directed outwardly from the channel member 11 and the latter will then pass into and communicate with a lateral channel 18 which has two outlet members or tubes 19 and 20 which are directed toward the feet of the occupants of the vehicle as seen in FIG. 2, and also there are provided two upwardly directed channels or pipes 21 and 22 having nozzle ends which have their exit openings such so that they can act as defrosters for the windshield of the vehicle.

The air which streams into the passages or casings 5 and 6 are indicated by arrows 7 and 8 and they direct the air around the exhaust tubes 3 and 4 so that the air will be heated from such exhaust tubes as a pre-heater and this air will be further heated when it passes around the heating chamber 15 in the heat line 11 so that in that way the air issuing from the outlets 19 and 20, as well as the defroster outlets 21 and 22, will be provided with a required warm temperature. In this way the temperature between the back outlets 12 and 13 and the front outlets 19 and 22 can be so regulated as may be desired in that as to the front outlets 19 to 22, it may be permitted to have a higher temperature than the air flowing out through the outlets 12 and 13. The temperature lost between the combustion chamber and the main heat outlets will thus be maintained as a minimum and FIG. 2 shows a preferred arrangement for the heating system as provided in a vehicle body.

Figure 4:
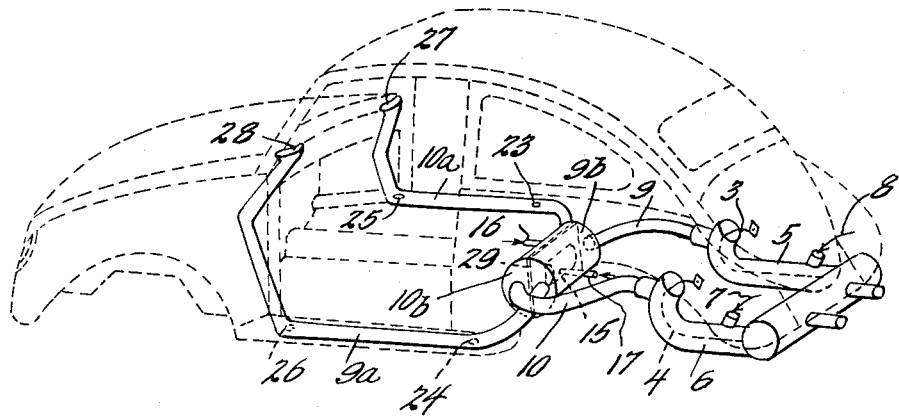
FIG. 4 is a perspective view of the system of FIG. 3 as mounted in a vehicle body.

FIGS. 3 and 4 show a modified heating system in which the combustion chamber 15 is provided at the back in the body of the vehicle and the entire heated air may be directed not only against the windshield of the vehicle but into the body of the vehicle. Identical reference characters are indicated in FIGS. 3 and 4 as in FIGS. 1 and 2, and as shown, the air will stream into the inlets as indicated by the arrows 7 and 8 to pass around the exhaust tubes 3 and 4, whereby the heat exchangers 5 and 6 will direct heated air laterally into heating passages 9 and 10. The combustion chamber 15 is provided as shown and is provided with channels 9a and 10a provided with end outlet nozzles 27 and 28 with intermediate outlets 25 and 26 as shown in FIGS. 3 and 4. The outlets 25 and 26 direct hot air toward the feet of the occupants and the outlets 23 and 24 are directed toward the bodies of the occupants of the vehicle. As shown in FIG. 4, the outlet nozzles 27 and 28 are directed on the internal surface of the windshield to act as defrosters. The combustion chamber 15 is divided by a common separating wall or plate 29 which thus acts to guide the two hot air tubes 9 and 9a as one line and 10 and 10a as the other line. The hot air lines or tubes 9b and 10b thus cross each other from one side of the vehicle body to the other as shown. The combustion chamber 15 is provided with an inlet 16 for the fuel-air mixture and an outlet 17 for the exhaust gases.

I claim as my invention:

A heating system for power vehicles with internal combustion motor near the back of the vehicle, comprising a heat exchanger extending around an exhaust gas line with the exchanger extending along each side of the engine, at least one auxiliary heater in the form of a combustion chamber within a casing, pipe connections to connect the casing with each heat exchanger, said chamber being adapted to receive a fuel-air mixture, a dividing wall in the casing and connected to the combustion chamber to provide two air lines in the auxiliary heater, and a pair of air lines one on each side of the vehicle and having a plurality of air outlet openings, said last-mentioned air lines connected to the two air lines in the auxiliary heater with the air lines and pipe connections crossing each other by means of the dividing wall so that the heated air from the heat exchanger on one side of the engine crosses over to the other side of the vehicle at the auxiliary heater, and the combustion chamber having a longitudinal axis at right angles to the longitudinal axis of the vehicle.

References Cited by the Examiner

UNITED STATES PATENTS

| 2,155,278 | 4/39 | Mautsch | 237—2 |
| 2,158,741 | 5/39 | Christman | 237—12.3 |
| 2,308,887 | 1/43 | McCollum | 237—2 |
| 2,342,872 | 2/44 | Le Fevre et al. | 237—2 |
| 3,096,938 | 7/63 | Cole et al. | 237—12.3 |

FOREIGN PATENTS

| 580,821 | 8/59 | Canada. |
| 523,206 | 1940 | Great Britain. |
| 527,025 | 1940 | Great Britain. |

EDWARD J. MICHAEL, *Primary Examiner.*